United States Patent Office 3,529,967
Patented Sept. 22, 1970

3,529,967
MINK FEED COMPOSITIONS
Ejvind Nissen Riisberg, Virum, Denmark, assignor to Lovens Kemiske Fabrik Produktionsaktieselskab, Ballerup, Denmark, a firm
No Drawing. Filed Sept. 2, 1966, Ser. No. 576,827
Claims priority, application Great Britain, Sept. 8, 1965, 38,415/65
Int. Cl. A23k 1/10
U.S. Cl. 99—7                                     5 Claims

ABSTRACT OF THE DISCLOSURE

A mink feed composition in dry form comprising from 30 to 60% by weight fishmeal having a protein content of at least 60% with a content of available lysine of at least 6%; from 1 to 10% by weight of water-soluble proteins of low molecular weight or peptides; and from 10 to 40% by weight carbohydrates. The composition may also contain from about 10 to 25% by weight of conventional animal feed components such as fats, vitamins, minerals, and the like.

---

The present invention relates to mink feed compositions in dry form, the essential constituents of which are fishmeal, watersoluble proteins of low molecular weight or peptides, or mixtures of these, and carbohydrates.

Being carnivores, the minks prefer to feed upon raw meat or fish, and since freshness of the fodder and a well-balanced diet is essential to obtain high quality furs, mink farmers generally prepare their own mink feed from current supplies of fresh offal, comprising surplus fish, and/or offal from slaughter-houses and meat consuming industries, supplemented by various fodder additives, such as vitamins and mineral mixtures.

Thus, unless deep-freezing facilities are available, the fish and/or meat components of the feed should not be more than 48 hours old on consumption, since otherwise a substantial deterioration will have set in, greatly detracting the feed value.

Thus, the enzyme thiaminase being present in the fresh fodder, will eventually decompose vitamin $B_1$, causing an avitaminosis in the animals, if the feed is not fresh, and offal from slaughter-houses may be infected with *Clostridium botulinum*, which produces the dreaded botulinum toxin.

Also, surplus fish or fish offal may, at certain seasons, comprise or consist of fish, such as coalfish, whitings, hakes and turbots, the use of which has proved the cause of certain fur defects, if the fish constituents are not subjected to a heat treatment.

Owing to the above factors, and also because mink stock as well as supplies of the above fodders are subjected to seasonal variations, it has been attempted to supply a feed composition, and more particularly a heat-treated dry feed composition, for the feeding of mink, in an attempt to eliminate seasonal variations, at the same time sterilizing the feed composition and destroying the thiaminase and the botulinum toxin, if any.

The result of using such dry feed compositions based upon fishmeal or the like, however, has not come up to expectations. Not only are these feeds apparently insufficient, but being in a pulverized form they are of a fineness incompatible with the wishes of the mink farmers since, as is well known, mink fodder is generally placed on a wire netting ceiling of a mink pen. This does not give difficulties if the fodder is minced meat or fish, but pulverized fishmeal or the like will run through the netting of the pen, and if it is mixed with water, it will be unable to form a mass sufficiently viscous or solid to correspond to the consistency of minced meat or fish.

It is the main object of the present invention to provide a dry mink feed composition equalling freshly prepared mink feed as regards quality, but being storable for weeks or months without noticable deterioration, thus making the mink farmers independent of daily supplies of fresh fish or meat components, and the transportation and refrigeration problems involved in avoiding deterioration.

With this object in view, a mink feed composition in accordance with the invention comprises from 30% to 60% of fishmeal having a protein content of at least 60%, and a content of available lysine of at least 6%, and in addition to the fish meal, the feed composition further contains from 1% to 10% of water-soluble, low molecular weight proteins or peptides, or both, whereby the basal demands of the animals are fulfilled as far as proteins are concerned, which is not the case if the fodder contains fishmeal only. Furthermore the composition contains from 10% to 40% of carbohydrates, which according to one embodiment of the invention substantially or at least partially consist of dried boiled potatoes, or dried boiled grain, such as barley, wheat, oats, or maize, or both, giving the feed a consistency, when mixed with water which permits it to be placed on, and supported by, the wire netting generally used for minced meat for mink feeding.

All percentages given above and hereinafter are by weight.

In another embodiment of the feed composition of the invention, glucose, saccharose, molasses, or similar carbohydrates, are used singly or in mixtures, preferably together with a minor quantity of dried boiled potatoes or cereals or both. This embodiment is preferred, if the mink feed composition of the invention is to be made into pellets. Compared with a powdered composition, pellets have the advantage that the feed composition is more easily distributed among the pens, without the loss experienced when using conventional feeding methods.

In a preferred embodiment of the mink feed composition of the invention, the fishmeal is a spraydried fishmeal, which is poor in fats. In producing a fishmeal of this kind, a preferred method consists in comminuting fresh fish and leniently heating the comminuted fish to a temperature not exceeding 60° C., removing the oil-containing water phase by centrifuging and spraydrying the remainder leniently.

The water-soluble proteins of low molecular weight and/or peptides may be the product called fish solubles, which is a byproduct in the fish oil industry, or they may be the more or less decomposed proteins, which are obtained as byproducts in the production of pharmaceutical preparations from lungs, intestines, liver, pancreas, or other organs, for example the production of heparin from lungs and intestinal mucosa, in which the raw material is subjected to extensive hydrolysis, resulting in a water-soluble fraction consisting of low molecular proteins, peptides and aminoacids.

A content of from 1% to 10% of the said fraction will ensure a desirably high content of easily available aminoacids, or even free aminoacids, in the mink feed composition, at the same time serving as an appetizer to make the minks eat the feed even in the form of pellets.

It is possible to use fishmeal produced from such fish as cod, plaice, flounder, lemon sole, or from such fatty fish as herring, mackerel, weever, or sand launce, in the mink feed composition of the invention.

It is important that the fishmeal is produced from fresh fish, and that anti-oxidants are added to prevent the fishmeal from becoming rancid, particularly if fatty fish are used.

The content of dried boiled potatoes or dried boiled grain will ensure that the feed composition when mixed with water obtains the desired consistency as a result of the partial decomposition of the starch content of the products in question during the boiling and subsequent drying. The said vegetable products will also supply indigestible matter aiding in the proper function of the gastrointestinal tract.

However, the present compositions are not limited to the use of the above starchy products only. Pretreated pure starch, or, if desired, suitable pretreated cereals, which after the pretreatment have the same properties as the aforesaid products as regards the consistency, may be used together with or instead of the dried boiled potatoes or dried boiled grain.

From 10% to 25% of the present mink feed compositions are conventional components, such as fats, whale meal, meat-and-bone meal and similar offal, and milk products, such as casein, and vitamins, minerals, and, if necessary, antibiotics. In any case, however, the basal protein and fodder requirements are covered by the fishmeal together with the low molecular, water-soluble proteins and/or peptides in conjunction with the starchy thickening agents and other carbohydrates as essential carbohydrate sources.

The present feed compositions are thus composed of easily accessible, stable raw materials, and they give results, which compete fairly well with those obtained, if minks are given a feed of the optimum composition consisting of fresh materials the accessibility of which is seasonal.

Furthermore, the nutritional value of the feed compositions of the invention is particularly high during the period of nursing. It is of particular importance that the compositions of the invention are at least equivalent to fresh fodder also during the said period, so that the mink farmers become totally independent of daily supplies of fresh feed constituents.

In the following examples, compositions of a conventional mink feed and various embodiments of the mink feed of the invention are given, together with the favourable results of feeding with the latter as compared with the former.

EXAMPLE 1

A conventional fodder based essentially on fresh starting materials, i.e. where perishable raw materials were less than 48 hours old, was prepared according to the composition shown below, in Table I, the amounts of the ingredients being given in percent by weight, apart from the vitamin content, which is in terms of international units or in micrograms per gram of fodder solids. The vitamins were mixed into the feed composition as the last step in its preparation.

Table I

| | Weight percent |
|---|---|
| Cod offal | 40.0 |
| Plaice offal | 19.0 |
| Tripe | 4.2 |
| Spleen | 1.7 |
| Poultry offal | 6.7 |
| Sour skim-milk | 4.2 |
| Lard | 1.7 |
| Wheat | 2.0 |
| Oats | 2.0 |
| Wheat-bran | 2.0 |
| Wheat germ | 0.8 |
| Combined iron preparation | 0.02 |
| Vitamins and chlorotetracycline [1] | 0.43 |
| Water | 14.6 |
| Dry yeast | 1.0 |

[1] See the following table:

Per gram of dry fodder—

| Vitamin— | | |
|---|---|---|
| A | I.U. | 15 |
| D | I.U. | 1.5 |
| E | μg | 30 |
| Thiamine | μg | 3 |
| Riboflavin | μg | 6 |
| d-Pantothenic acid | μg | 14 |
| Nicotinic acid | μg | 40 |
| Pyridoxine | μg | 2 |
| Folic acid | μg | 0.8 |
| Biotin | μg | 0.2 |
| Vitamin $B_{12}$ | μg | 0.05 |
| Menadione Na-bisulphite | μg | 4 |
| Choline | μg | 150 |
| Chlorotetracycline | μg | 20 |

The combined iron preparation stated in Table I also contains salts of essential micro-minerals, cf. the following list of components, the amount of which are stated in terms of grams per kilogram of iron preparation.

| | |
|---|---|
| Ferrous sulphate | 780 |
| Copper sulphate | 80 |
| Manganous sulphate | 80 |
| Cobalt sulphate | 20 |
| Zinc sulphate | 30 |
| Potassium iodide | 10 |

In the following the above fodder will be designated control fodder K, or just K.

The advantageous results obtained by feeding with a fodder composition according to the invention have been demonstrated in animal experiments comprising seven groups of mink kits, each group consisting of 25 male and 25 female animals, a total of 50 animals, which for the sake of the evaluation of the quality of the fur consisted of 10 white kits, 20 pastel kits and 20 standard kits.

The experiment was initiated when the kits were 10 weeks old, and was continued until they were skinned at an age of about 7½–8 months.

The control group was given the above fresh fodder, called K, whereas each of the other 6 groups were given a mink feed according to the invention, the compositions of which were as stated in columns 1 to 6 in the following Table II. The feeds of the invention were prepared in single batches prior to the initiation of the experiments, which means that they were up to 5 months old when last fed to the minks.

TABLE II

| Experimental mixture No. | 1 | 2 | 3 | 4 | 5 | 6 |
|---|---|---|---|---|---|---|
| | Weight percent | | | | | |
| Fishmeal | 38 | 30 | 38 | 23 | 40 | 32 |
| Herring-meal | 10 | 20 | 10 | 15 | | 10 |
| Fish solubles, spray dried | 3 | | | 10 | 3 | |
| Meat-and-bone meal 65% protein | 5 | 7 | 3 | 5 | 5 | 5 |
| Dried poultry offal | | | 5 | | | |
| Blood meal | 3 | 3 | 3 | 3 | 10 | 2 |
| Skim-milk powder | 2.7 | 2 | | 2.54 | 3 | |
| Whey powder | | 1 | | | | |
| Buttermilk powder | | | 2.54 | | | 1.94 |
| Dry yeast | 3 | 3 | 3 | | 3 | 3 |
| Lard | 8 | 10 | 4 | 4 | | |
| Soy-bean oil | 2 | | 2 | | 8 | |
| Soy-bean oil meal | 5 | 8 | 5 | 12 | 5 | 5 |
| Wheat [1] | | 2 | | 3 | | |
| Oats [1] | | 2 | | 4 | | |
| Barley [1] | | 2 | | | | |
| Dried boiled potatoes | 19.84 | 8.54 | 24 | 14 | 22.54 | 40 |
| Molasses | | 1 | | 4 | | |
| Methionine | | | | | | 0.15 |
| L-lysine HCl | | | | | | 0.45 |
| Combined iron preparation | 0.06 | 0.06 | 0.06 | 0.06 | 0.06 | 0.06 |
| Vitamin mixture and chlorotetracycline | 0.40 | 0.40 | 0.40 | 0.40 | 0.40 | 0.40 |

[1] Steam treated.

For the preparation of the experimental preparations 1 to 6, the same combination of mineral salts was used as that used for the production of the control fodder just as the same vitamin and chlorotetracycline preparation was added.

Approximately 20 minutes before the feeding time, the dried feed compositions were mixed with so much water that they could be placed on the netting of the pen without falling through. The animals were fed twice daily in such a way that of the total amount of fodder ¼ was given in the morning, and the remaining ¾ late in the day. The total amount of feed composition was adapted to the appetite of the animals.

The growth increase in the experimental period was excellent for all groups, and there were no signs of disease and no death within the said period. The ultimate weighings took place before the skinning, and gave the following results:

|  | Control | 1 | 2 | 3 | 4 | 5 | 6 |
|---|---|---|---|---|---|---|---|
| Average weight: | | | | | | | |
| Male animals, gr | 2,100 | 2,100 | 2,090 | 2,010 | 2,050 | 2,150 | 2,010 |
| Female animals, gr | 1,150 | 1,160 | 1,130 | 1,100 | 1,105 | 1,160 | 1,100 |
| Average fur value | 100 | 108 | 103 | 99 | 100 | 102 | 97 | indicating that feeding the compositions of the invention results in just as good a growth, as well as the same, or perhaps an even better fur quality than if the animals receive a fresh fodder of a composition empirically giving an optimum mink stock.

EXAMPLE 2

The utility of the present dry feed compositions during the nursing period has been demonstrated in animal experiments where the control group and the experimental group each comprised 20 standard females.

The composition of the feed given to the control group appears from Table III, and of that given to the experimental group from Table IV below.

Of the male animals, also included in the experiment, half were given a control fodder of a composition shown in the following Table III, and the other half were given a feed composition according to the invention, as shown in the following Table IV. To avoid the influence of possible sterility in a male animal, mating was performed in such a way that each male animal was mated with two females from the experimental group and two females from the control group.

Table III

| | Weight percent |
|---|---|
| Fish offal (cod and plaice) | 66 |
| Offal from cattle or poultry | 18 |
| Sour skim-milk | 8.0 |
| Dredge (equal quantities of barley and oats) | 3.6 |
| Wheat bran | 3.44 |
| Combined iron preparation | 0.06 |
| Vitamin preparation | 0.4 |
| Dry yeast | 0.5 |

Table IV

| | |
|---|---|
| Fishmeal | 46 |
| Herring-meal | 10 |
| Fish solubles, spray dried | 3 |
| Meat-and-bone meal 65% protein | 5 |
| Blood meal | 3 |
| Skim milk powder | 3 |
| Dry yeast | 3 |
| Lard | 5 |
| Dried boiled potatoes | 19.54 |
| Steam treated wheat | 2 |
| Micro-minerals | 0.06 |
| Vitamin preparation | 0.4 |

The vitamin preparations and the combined iron preparations of the above Tables III and IV are the same as in Table I.

The experiment commenced on the 1st of December, and the above fodders were supplied as described until whelping had taken place around the 1st of May next year, whereupon, conventionally, a change was effected in the fodder composition on account of the nursing, 6.2% of the fishmeal in the experimental feed composition, and a corresponding amount of the fish offal in the control fodder being substituted by 4% lard, 2% glucose, and 0.2% common salt.

These fodders were given during the entire nursing period. After that, the kits of females fed on the experimental feed composition were given a fodder corresponding to that stated in Table II, whereas the kits of females fed on normal fodder were given the control fodder stated in Table I.

As a result of the experiment, it was established that the number of barren females of the control group as well as of the experimental group was 3, and that the number of liveborn kits of the group fed on normal fodder of the composition stated in Table III was 4 per female, whereas the corresponding number of the group fed on the experimental feed composition of Table IV was 4.2 per female. At the cessation of the nursing period, the number of kits per female of the control group was 3.8, and per female of the experimental group, 3.9.

During the nursing period, the kits of the control group grew somewhat quicker than the kits of the experimental group, but this difference was equalized 6 weeks after weening, which appears from the result stated in Table V below, where the average weight of the kits after adolescence and their fur value are stated for male as well as for female animals.

TABLE V

| | Control | Experimental |
|---|---|---|
| Average weight male animals, g | 2,050 | 2,070 |
| Average weight female animals, g | 1,130 | 1,125 |
| Average fur value | 100 | 102 |

The feed composition according to the present invention is appropriately prepared by mixing its components in dry form whereby a powder is obtained which when mixed with water may be given the desired consistency.

EXAMPLE 3

A mink feed in pellet form was prepared from the following components:

| | Weight percent |
|---|---|
| Fish-meal | 47 |
| Dry boiled potatoes | 18 |
| Lard | 9 |
| Sugar | 8 |
| Molasses | 5 |
| Casein | 4 |
| Fish solubles | 2 |
| Barley husk meal | 4 |
| Dry yeast | 2 |
| Vitamin preparation | 0.88 |
| Combined iron preparation | 0.12 |

The vitamin and combined iron preparations were composed as in Example 1.

This feed in pellet form was compared with a conventional mink feed prepared from fresh fish et cetera, so as to contain substantially the same amounts of proteins, fats, carbohydrates, vitamins and micro-minerals.

For the experiment, 50 female kits and 50 male kits were used, being equally divided after weight and sex into a control group and an experimental group.

The average weight before slaughtering, and the average fur values are given below:

| | Controls | Pellets |
|---|---|---|
| Males, gr | 2,110 | 2,190 |
| Females, gr | 1,140 | 1,130 |
| Fur value | 100 | 107 |

EXAMPLE 4

A further group of test animals was composed as in Example 3, and was fed with a feed composition based upon a special carefully produced fish meal, being very poor in fats and containing substantially all lysine in available form.

The said fishmeal was prepared as follows:

Newly caught fish was passed several times through a meat chopper, and the minced material was steam treated for 10 minutes. After that, it was twice centrifuged, the supernatants after each centrifuging being left until the oil had separated and could be removed.

The remaining aqueous phases were mixed with the solid matter from the centrifuging, and surplus water was added to allow drying in vacuum pans or by spray drying, whereby care was taken that the temperature of the material was kept below 60° C., and the dry material was immediately cooled and packed. Its fat content was 0.4%.

A mink feed was made from this fishmeal in the proportions given in Example 3, except that owing to the fishmeal being poor in fats, 45% of fishmeal and 11% of lard were used.

In the following table the averages are compared with those of the control group of Example 3.

|  | Control | Experimtntal feed |
|---|---|---|
| Males, gr | 2,110 | 2,310 |
| Females, gr | 1,140 | 1,210 |
| Fur value | 100 | 110 |

The better results are probably due to the removal of a substantial part of fish oil from the meal, since fish oil is very unstable owing to a large content of unsaturated fatty acids, making great demands upon the depots of tocopherols and other antioxidants in the test animals.

I claim:

1. A mink feed composition in dry form, comprising from 30% to 60% fishmeal, having a protein content of at least 60%, with a content of available lysine of at least 6%; from 1% to 10% of at least one member of the group consisting of water-soluble proteins of low molecular weight and peptides; from 10% to 40% carbohydrates, and from 10% to 25% of other feed components, including fats, vitamins and minerals.

2. A mink feed composition according to claim 1, which is in pellet form.

3. A mink feed composition according to claim 1, in which at least part of the carbohydrates consists of dried boiled potatoes.

4. A mink feed composition according to claim 1, in which at least part of the carbohydrates consists of dried boiled cereals.

5. A mink feed composition according to claim 1, in which the fishmeal is a vacuum dried fishmeal, which is poor in fats.

References Cited

UNITED STATES PATENTS

| 2,558,092 | 6/1951 | Kelly et al. | 99—7 |
| 3,359,115 | 12/1967 | Lanz | 99—7 |
| 3,437,489 | 4/1969 | Arakawa et al. | 99—7 |

FOREIGN PATENTS 8,422  7/1932  Australia.

OTHER REFERENCES

Morrison, Feeds and Feeding, The Morrison Publishing Co., pp. 555 and 389, 1956.

Berglund, Feedstuffs, vol. 37, p. 60, Mar. 13, 1965.

LIONEL M. SHAPIRO, Primary Examiner

U.S. Cl. X.R.

99—2